Sept. 5, 1967     G. W. BROOKS ET AL     3,339,404
LUNAR PENETROMETER
Filed Nov. 26, 1963     5 Sheets-Sheet 1

INVENTORS
GEORGE W. BROOKS
JOHN L. McCARTY
ALFRED G. BESWICK

ATTORNEYS

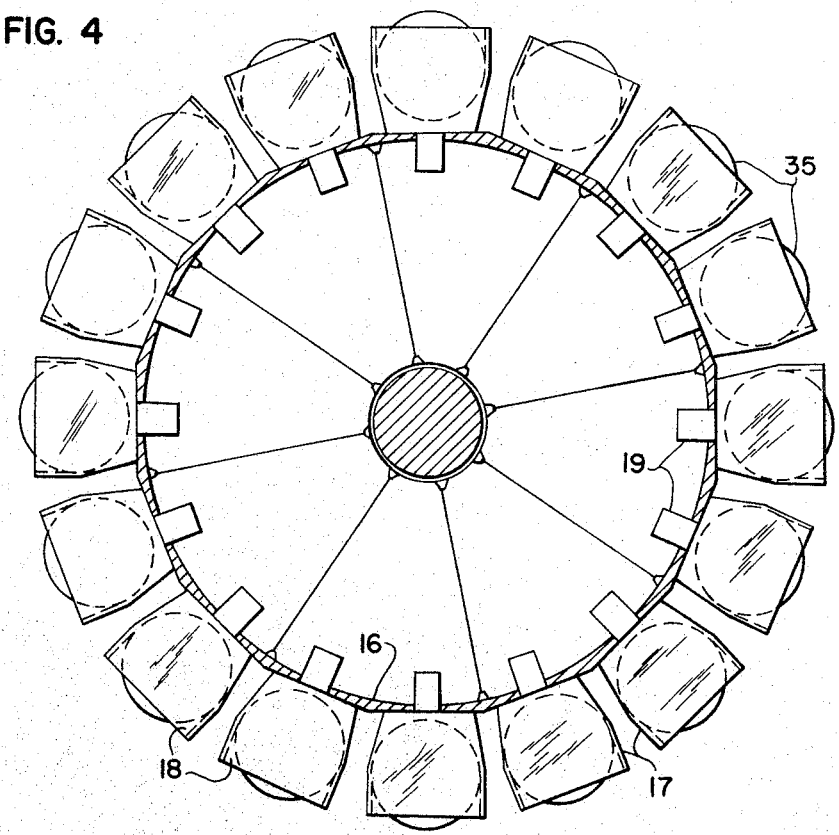
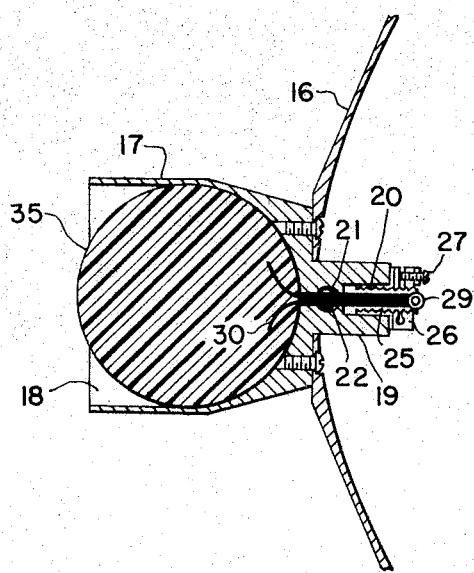

3,339,404
Patented Sept. 5, 1967

3,339,404
LUNAR PENETROMETER
George W. Brooks, Tabbs, John L. McCarty, Hampton, and Alfred G. Beswick, Virginia Beach, Va., assignors to the United States of America as represented by the Administrator of the National Aeronautics and Space Administration
Filed Nov. 26, 1963, Ser. No. 326,298
30 Claims. (Cl. 73—84)

ABSTRACT OF THE DISCLOSURE

A launch vehicle delivers a payload to the vicinity of a remotely disposed body such as the moon. Mechanism separates at least one penetrometer and directs it against the body. The penetrometer houses an accelerometer and transmitter. The accelerometer impact output modulates the transmitter whose emissions are received at a remote point. The received impact acceleration data is compared with known acceleration time histories for various earth materials to determine physical properties such as surface hardness, bearing strength and penetrability of the body.

The invention described herein may be manufactured and used by or for the Government of the United States of America for governmental purposes without the payment of any royalties thereon or therefor.

This invention relates to a device for determining certain physical properties of a surface, such as its hardness, bearing strength and penetrability. The device is in the form of a penetrometer and it is applicable to evaluating those properties of a remotely disposed surface like that of the moon.

There are many well known methods for determining characteristics of a surface, such as, the Brinell and Rockwell hardness tests. Generally speaking, such hardness tests are based upon the principle of loading or impacting the test surface with devices of greater hardness than the test surface. The amount of penetration or rebound height resulting from the test is then measured to determine the hardness of the material. Obviously, these techniques could be utilized to determine characteristics of the lunar or planetary surface if specimens of the various surfaces were readily available. However, since it is not yet possible to collect test specimens from lunar or planetary surfaces, these methods are at present untenable. Another technique would be to land a vehicle on the surface in question, perform an analysis of the surface and relay the information to earth. Due to present limitations, manned landings cannot be made, therefore such tests must be operated remotely. However, these remotely operated techniques place severe demands upon equipment performance, and are furthermore limited to the examination of a small surface area. With the approach of landing a man on the moon and planets, it is essential to have a prior knowledge of the prospective landing sites. Reliable data on the nature of such surfaces is needed not only to abet scientific knowledge and understanding, but also to provide engineering design data so that spacecraft landing gear structure may be constructed with adequate safety margins and without undue penalities in weight and complexity.

The invention under consideration herein provides a means for measuring the physical properties of a surface such as hardness, bearing strength and penetrability while avoiding the complexity and the operational problems associated with the other surface-measuring techniques. The principle of operation consists of impacting a penetrometer onto the surface in question and transmitting the developed impact acceleration time history to a remote point. These data can then be compared with acceletration time histories developed from impacts on known earth materials to permit classification of the surface undergoing measurement in terms of the known earth materials.

It is, therefore, an object of this invention to provide one or more penetrometers as a technique for determining certain physical properties of remotely located surfaces.

Another object of this invention is to provide one or more penetrometers as a technique for measuring the hardness of a large surface area.

Still another object of this invention is to provide one or more penetrometers as a technique for measuring surface hardness by utilizing the acceleration time histories developed by impacting penetrometers.

A further object of this invention is to provide one or more penetrometers as a technique for determining surface hardness which have the capability of transmitting accurate acceleration time histories regardless of the angular acceleration or orientation of the penetrometer during impact.

Yet another object of this invention is to determine certain physical characteristics of a remote surface such as that of the moon or a planet by impacting one or more penetrometers having the capability of transmitting its deceleration rate upon impact to a relay station, and relaying the information to a receiving station.

Another object of the invention is to employ one or more penetrometers having a capability of distinguishing layer characteristics of target materials.

These and other objects and advantages of the invention will become more apparent when taken in conjunction with the accompanying drawings.

In the drawings:
FIG. 1 is a pictorial view showing a possible flight operational sequence which could be utilized for measuring certain physical characteristics of a remote surface, such as that of the moon;

FIG. 4 is a cross-sectional view taken along the section lines IV—IV of FIG. 2;

FIG. 5 is an enlarged cross-sectional view of a segment of the penetrometers and relay station showing in detail the structure for securing a penetrometer to the relay station and for releasing it therefrom;

Basically, this invention relates to a method and apparatus for measuring certain physical properties of a remote surface. This is accomplished by penetrometers which have the capability of measuring and transmitting impact accelerations. Within the penetrometers, the impact accelerations are sensed by a transducer such as an accelerometer, the output of which is used to modulate a transmitter whose emissions are received at a remotely located receiving station. The received impact acceleration data is compared with known acceleration time histories for various earth materials to relate properties such as surface hardness, bearing strength and penetrability. The application of this concept to evaluate lunar or planetary surfaces may include the use of a relay station to intercept the penetrometer signals for subsequent retransmission at suitable frequency and power levels to earth or to other spacecraft.

Figure 1:
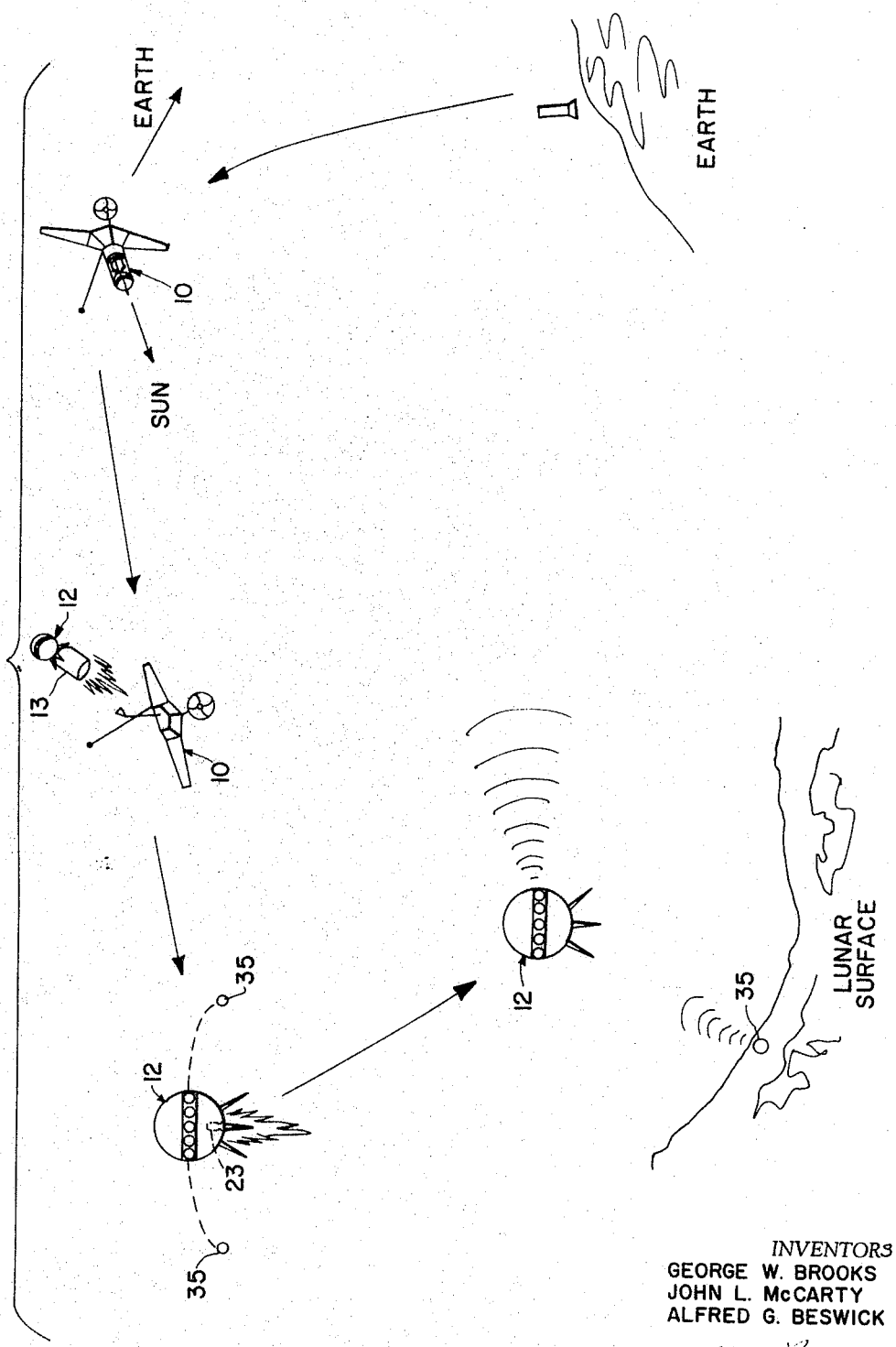

Referring now more specifically to the details of the invention, FIG. 1 shows a pictorial view of a possible flight operational sequence of events used to deploy penetrometers onto a surface to be measured—in this case, the lunar surface. The spacecraft designated generally by the reference numeral 10 is shown in the first instance in the Earth-to-Moon transit phase. The next phase shows penetrometer payload 12 and its retrometer 13 separating from the spacecraft 10. The third phase shows the penetrometer payload following main retroburnout discharging penetrometers 35 during burning of the secondary retro 23. The final phase shows one of the penetrometers impacting onto the lunar surface and transmitting the developed impact acceleration time history to the still aloft payload. This phase also shows the payload serving as a relay station, retransmitting the acceleration data to a remote receiving station.

Figure 2:
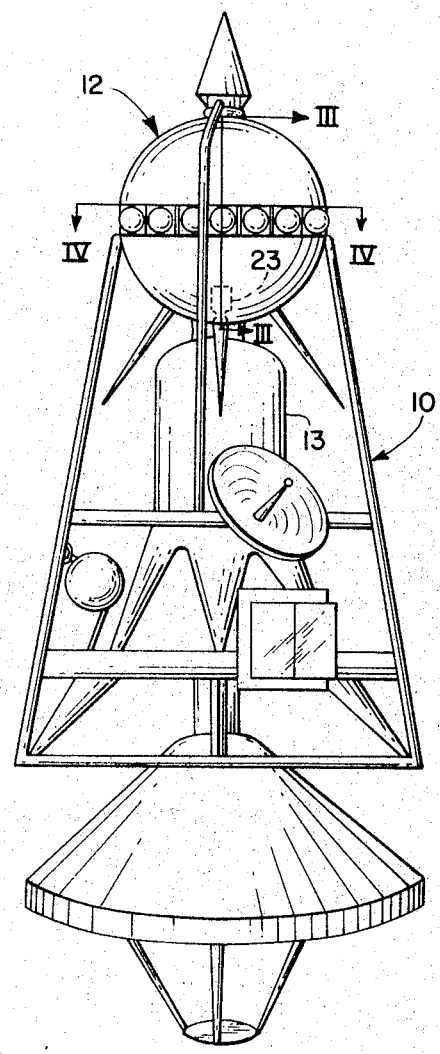
FIG. 2 is a side elevational view of a spacecraft showing the components thereof including the relay station and penetrometers carried thereby.

FIG. 2 shows the spacecraft 10 and the mounting of the penetrometer payload 12. The penetrometer payload is pictured here as payload of the Ranger spacecraft; however, it is to be understood that various spacecraft could be utilized to carry the payload to the desired location. The main retro-rocket 13 is also shown pictorially in FIG. 2 and is utilized to slow the payload 12 down as it approaches the test surface. The main retrorocket 13 is of conventional design and may be jettisoned, in a conventional manner, from the payload 12 upon completion of its function.

Figure 3:
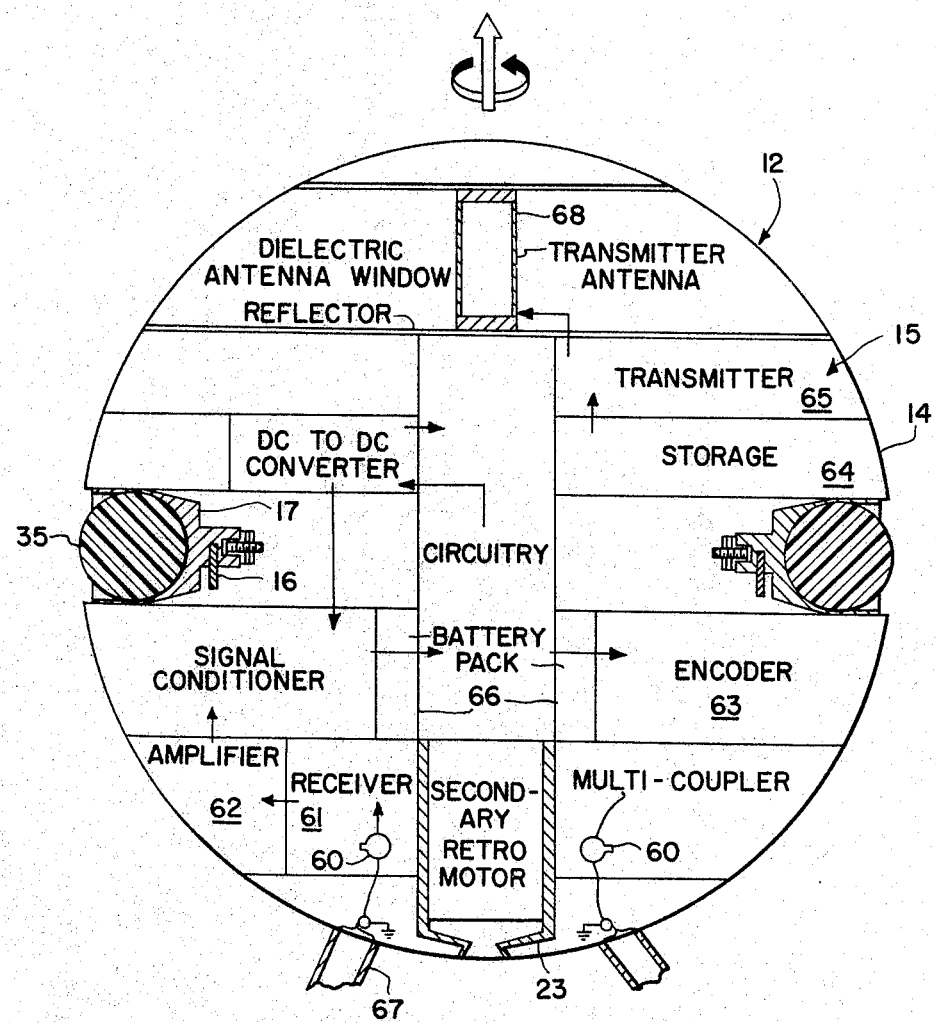
FIG. 3 is a cross-sectional view, enlarged, of the relay station and penetrometers shown in FIG. 2 taken along the section line III—III of FIG. 2.

FIG. 3 is a diagrammatic sketch of the modular components of the penetrometer payload 12, which also operates as a relay station. The payload has a generally spherical-shaped housing 14. Communication equipment, designated generally by the reference numeral 15, is positioned within the housing 14 and includes conventional electronic components such as a multicoupler 60, receivers 61, amplifier 62, encoder 63, electronic data storage 64, transmitter 65, battery packs 66, receiving and transmitting antennas 67 and 68, among other equipment.

Fixed to the equator of housing 14 in a conventional manner such as by welding or fasteners is a generally cylindrical-shaped carriage 16 (FIGS. 3 and 4). The carriage 16 supports a series of canisters 17 which are located at equally spaced intervals about the circumference of the carriage. The canisters 17 are also generally cylindrical shaped having an open and closed end. The exterior walls of the canisters form ramps or tracks 18 for guiding the release of the penetrometer from the open ends in a manner which will become apparent hereinafter. Obviously the canisters can take different shapes and configurations to accommodate penetrometers of various designs. Feet that project through apertures formed at various points about the carriage are formed on the closed end of the canisters. The canisters 17 are fixed to the carriage 16 by threaded fasteners as shown in FIG. 5. The feet 19 have stepped bores 20 (FIG. 5) extending throughout the longitudinal extent thereof. Intersecting the stepped bores 20 are cutter chambers 21 which house reefing or cutting mechanism 22. The cutter or reefing mechanism 22 is of conventional design and may be a parachute line reefer of the explosive type. The blades of the cutter are positioned so that they pass across or intersect the stepped bore 20 upon actuation for purposes which will be explained more fully hereinafter.

The enlarged portion of the stepped bore 20 receives a tensioning stud 25. The tensioning stud 25 has a collar formed on one end thereof which is in sliding engagement with the stepped bore 20, and the other end thereof threaded to receive a split nut 26. The threaded end face of the tensioning stud 25 is notched to form a cradle for a retaining pin 29. A cable 30 passes through the stud 25, which is hollow, and about the retaining pin 29. The cable also passes through the stepped bore 20 and has the ends thereof embedded in the penetrometer 35. As clearly shown in FIG. 5, when the split nut 26 is turned the stud 25 is drawn from the stepped bore 20 placing a tension on the cable 30 to rigidly fix the penetrometer 35 with respect to the payload 12. The cable 30 is constructed of a material such as nylon cord which is readily separable by the cutter or reefer 22. When the proper tension has been applied to the retaining cable 30, the screw 27 which is threaded through one portion of the split nut 26 is advanced forcing the split nut to spread and jam against the threads of the retaining stud 25 thereby locking the nut on the stud and the penetrometers in position.

Figure 6:
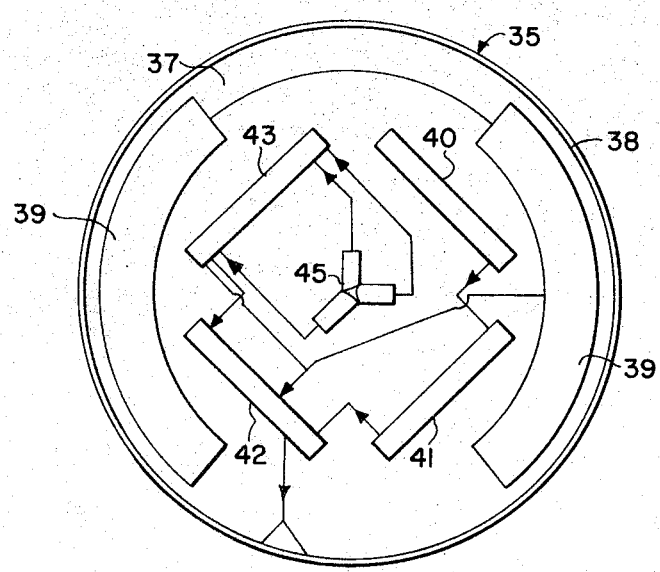
FIG. 6 is a diagrammatic sketch of a spherical omnidirectional penetrometer showing the modular components for measuring and transmitting accelerations.

The penetrometers 35 may take various shapes and configurations; however, a spherical omnidirectional penetrometer as shown in FIG. 6, is most desirable since it can measure acceleration time histories independent of its angular acceleration or orientation at impact, and the surface topography. The penetrometer 35 may be constructed from various materials such as epoxy resin with fiber glass filler. The various components are embedded in the material to form a composite body suitable for impacting against a test surface. Included in the composite structure is a power supply such as battery packs 39 (see FIG. 6). The batteries furnish power to the various electronic components. A conventional triaxial accelerometer 45, is positioned at the geometric center of the penetrometer. The accelerometer 45 is connected to a squaring and summing circuit 43, the output of which is fed to an RF amplifier 42. A master oscillator 40 is connected to a buffer amplifier 41 which is in turn connected to the RF amplifier 42. The oscillator and amplifiers form a conventional transmitter, the output of which is fed to a spherical antenna 38 embedded in the outer skin of the penetrometer.

Figure 7:
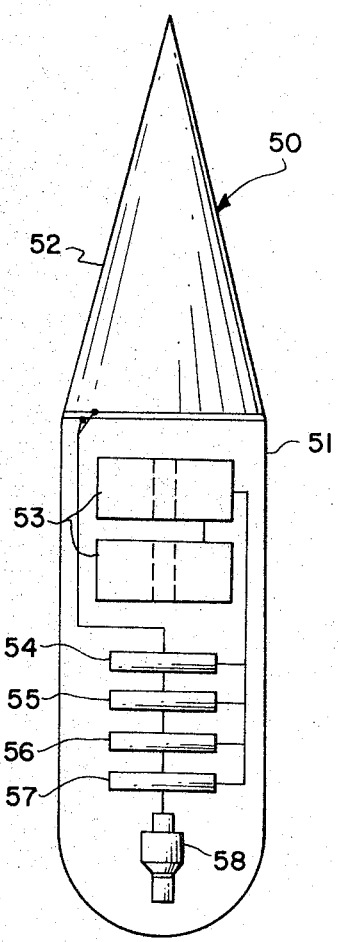
FIG. 7 is a diagrammatic sketch of a unidirectional penetrometer showing the modular components for measuring and transmitting accelerations.

A modified penetrometer is shown in FIG. 7 and designated generally by the reference numeral 50. This penetrometer is a unidirectional penetrometer whereas the penetrometer 35 is an omnidirectional penetrometer, the essential difference being the acceleration sensing transducer. The penetrometer 50 is a projectile-shaped configuration generally cylindrical in shape throughout a substantial portion of its length with a hemispherical nose section and a conical tail section. The cylindrical portion of this body including the nose may also be composed of a material such as epoxy resin with a fiber glass filler. A conventional unidirectional accelerometer 58 is located in the hemispherical nose section, the output of which is fed to a signal conditioner 57. A master oscillator 56, buffer amplifier 55, and RF amplifier 54, forming the conventional transmitting circuitry. The output of the signal conditioner 57, modulates the transmitter 54–56, the output of which is fed to the conical antenna 52 embedded in the surface of the tail section. Battery packs 53 furnish power to the various electronic components.

Figure 8:
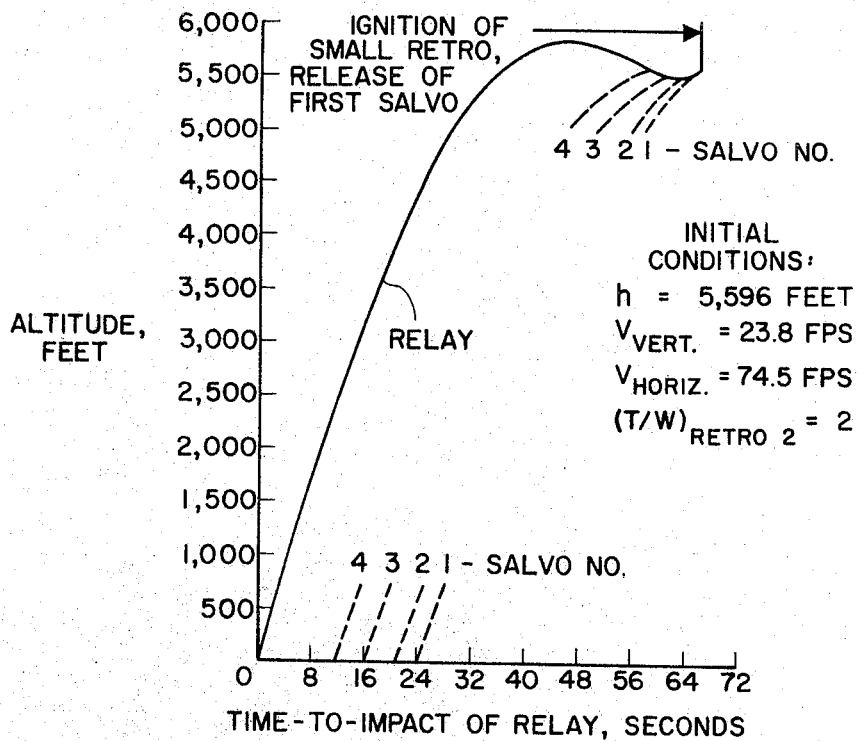
FIG. 8 is a graphical representation of time versus altitude showing trajectories of released penetrometers.

A secondary retrorocket motor 23 is carried by the penetrometer payload to retard the descent of the payload in the vicinity of the test surface during release of the penetrometers, to provide the relay station with sufficient time to retransmit the received penetrometer signals as illustrated in FIG. 8. FIG. 8 relates the altitude above the test surface of the penetrometers and relay station to the time of impact of the relay station. The figure shows the effect of the 10-second burning of the secondary retrorocket motor on the relay station trajectory during the release of the penetrometer salvos at 2-second time intervals. This procedure will become more apparent in the discussion of the operation now to be described.

*Operation*

In general, the impact of a projectile onto a target surface may be classified into one, or a combination of two or more, of three basic types: elastic, plastic or penetration. The shape of the impact acceleration-time signature is unique for each impact type and thus can be used to identify various characteristics of the test surface. Therefore, by conducting various impact studies on earth, it is possible to relate acceleration time histories to various materials. Impact acceleration time histories from remote test surfaces such as the lunar surface, when compared with the acceleration time histories of terrestrial materials, will provide a knowledge of such physical properties as hardness, bearing strength and penetrability of the remote surface.

The technique and apparatus of this invention make it possible to obtain this information. In the case of the lunar surface, a possible mode of operation is as follows; however, it is to be understood that the scope of the invention is not limited in any sense to this mode. The payload 12 including the relay station structure and the penetrometers 35 are mounted in a spacecraft such as 10 and boosted into space by a conventional booster structure and technique. The spacecraft 10 is placed in a trajectory such that it will impact the payload upon the lunar surface. However, before the spacecraft reaches the lunar surface the payload 12 is separated from the spacecraft and spun for axis attitude stability in a conventional manner. Thereafter, the main retrorocket motor 13 is ignited to reduce the descent velocity of the payload. The main retrorocket is jettisoned from the payload at burnout when the payload is approximately 5,600 feet above the test area. At this instant, the secondary retrorocket motor 23 is fired and the first salvo of penetrometers is released by cutting the proper retaining cables 30 with the explosive cutters 22. The ignition of the secondary retrorocket motor and the explosive cutters may be controlled by conventional timers. The centrifugal force acting on the penetrometers due to the spin stabilization technique previously applied to the penetrometer payload structure causes the released penetrometers to disperse as they free fall toward the lunar surface. As pictured in FIG. 8, salvos 2, 3, and 4 are subsequently released at spaced time intervals. The method of release of the subsequent salvos is identical to that of the first salvo. As shown in FIG. 5, 16 penetrometers are located about the circumference of the payload carriage. These penetrometers are released in salvos of four, there being four separate salvos. The four penetrometers of each salvo are released simultaneously in a manner such that the payload stability remains undisturbed.

Assuming that the penetrometers are released at two-second intervals and the secondary retrorocket motor burns for ten seconds, the penetrometers will all have been released before the secondary retrorocket burns out. Since the secondary retrorocket motor will decrease the payload rate of descent, the time interval between the impact of the salvos will be somewhat greater than two seconds. Given the initial conditions as illustrated in FIG. 8, the firing of the secondary retrorocket motor will cause the payload to gain altitude. After secondary retroburnout, the payload free falls to the lunar surface.

Since the relay station is spinning at approximately 285 revolutions per minute, the released penetrometers will have a horizontal velocity with respect to the payload of about 27 feet per second. Furthermore, since the penetrometers are released at an altitude of about 5600 feet at a nominal descent velocity of about 24 feet per second, the penetrometers of a salvo will be separated by about 2200 feet at impact. The area covered by the salvos of penetrometers can be large or small and furthermore can be readily controlled by an appropriate modification to the payload flightpath.

The physical process of the penetrometers impacting on the lunar surface is transduced to a representative electrical signal by the conventional triaxial piezoelectric type accelerometer 45. The output of the accelerometer is squared and summed by the circuitry 43. The vector summation output of this circuitry is an impact acceleration signature which is independent of angular accelerations or orientation of the penetrometer during the impact process. This vector summation signal modulates the emission of a conventional radio transmitter 40–42 contained within the penetrometer. The modulated transmitter output signal is fed to the penetrometer antenna 38 and emitted therefrom.

The information signal radiated by the impacting penetrometer is received by the payload relay station receiving antenna 67 and routed via a multicoupler 60 to radio receiver modules 61. The signals are detected, amplified and/or conditioned as necessary by circuitry 62, then converted from the analog form in which they were developed to a digital form more suitable for later operations, by means of an analog to digital encoder 63.

The coded digital representation of the impact acceleration signature is temporarily stored electronically by the relay station storage circuitry 64, and subsequently read out of this storage at a much slower rate than which the physical process occurred. The information transmission rate reduction thus achieved substantially alleviates the peak power required of the relay to earth radio transmission. Hence, there is a less stringent requirement of the payload power supply system 66 although a longer required transmission time. However, the transmission time duration can be provided as previously indicated. The digital signals read out of storage modulate the conventional relay to earth transmitter 65, the output of which is fed to the relay to earth transmitting antenna sysem 68, and subsequently emitted. This communication takes place within the time interval between release of the penetrometers and impact of the payload on the lunar surface. Certain physical characteristics, such as surface hardness, bearing strength and penetrability, of a remote surface such as the moon or a planet can thus be ascertained by the technique and apparatus as described.

The operation of the modified unidirectional penetrometer 50 is much the same as the omnidirectional penetrometer 35. The penetrometers 50 are launched from the payload to free fall nose first. The proper launching of such penetrometers in environments without a measurable atmosphere will permit the penetrometer to maintain a nose first attitude throughout flight to impact. Upon impact with the test surface, the unidirectional accelerometer 58 in the nose of the penetrometer will transduce the impact process to a representative electrical signal. The signal is transmitted from the penetrometer to the relay station in much the same manner as previously described for the omnidirectional system. The launch or release of the penetrometer 50 is also similar to the release of the penetrometer 35.

From the above description of the invention, it is apparent that the application of penetrometers as herein described is a useful and valuable technique for determining certain physical characteristics of remote surfaces. Furthermore, it is possible to determine such information without requiring complex instrumentation to operationally survive a landing on that surface. Measurements can be obtained regardless of whether the surface is soft dust or rock, and regardless of surface topography. The concept is also applicable to the investigation of surface layer characteristics, since the acceleratometers can be made sensitive to variations in the penetrometer acceleration as it passes through the various layers. The invention can be utilized as a technique for sounding prospective landing sites for manned landing spacecraft. This sounding would be accomplished according to the principles of the invention; however, the impact acceleration information from the penetrometers would be received and analyzed by the crew of the manned spacecraft.

While there has been described a preferred embodiment of this invention, it will be recognized that various modifications of this invention may be made within the framework of its principles. Such of these modifications as embody the principles of the invention are to be considered as included in the hereinafter appended claims unless these claims by their language expressly state otherwise.

What is claimed as new and desired to be secured by Letters Patent of the United States is:

1. A method of determining certain physical properties of a surface including the steps of: directing a body toward the surface; impacting the body against the surface; communicating from the body the impact acceleration data thereof; collecting the acceleration data; and comparing the data with known acceleration data for establishing surface characteristics.

2. A method of determining certain physical properties of a surface including the steps of: directing a body toward the surface; impacting the body against the surface; transmitting electronically from the body the impact acceleration time data thereof; receiving the acceleration time data and comparing the acceleration time data with known acceleration time histories for establishing surface characteristics.

3. A method of determining certain physical properties such as hardness of the surface of an interplanetary body including the steps of: launching a payload into a position in the proximity of a planetary body; separating a penetrometer from the payload and directing it toward the planetary surface; impacting the penetrometer against the planetary surface; transmitting from the penetrometer the acceleration time data thereof; receiving the acceleration time data; and comparing the data with a known acceleration time history to determine surface characteristics such as hardness.

4. A method of determining certain physical properties of the surface of a planetary body including the steps of: launching a payload into a position in the proximity of a planetary body; separating a penetrometer from the payload and directing it toward the planetary surface; impacting the penetrometer against the planetary surface; transmitting from the penetrometer the acceleration time data thereof; receiving the acceleration time data at the payload; relaying the data from the payload; receiving the data on another planet, and comparing the data with known acceleration time histories to determine certain physical properties of the surface.

5. A method of determining certain physical properties of the surface of a planetary body including the steps of: launching a payload into a position in the proximity of a planetary body; separating salvos of penetrometers at spaced intervals from the payload and directing them toward the planetary surface; impacting the penetrometers against the planetary surface; transmitting from the penetrometers the acceleration time data thereof; receiving the acceleration time at the payload; digitizing the data and storing it temporarily; reading the data out of storage at a much slower rate; relaying the data from the payload; receiving the data on another planet, and comparing the data with known acceleration time histories to determine surface hardness and other physical properties of the surface.

6. A method of determining certain physical properties of the surface of the moon including the steps of: launching a spacecraft into a moon impact trajectory; separating a payload from the spacecraft before reaching the moon; firing a retro device to curb the movement of the payload toward the moon; releasing salvos of penetrometers at spaced intervals during retrofiring and directing them toward the moon; impacting the penetrometers against the surface of the moon; transmitting electronically from the penetrometers the acceleration time data thereof; receiving the acceleration time data at the payload; digitizing the data and storing it temporarily; reading the data out of storage at a much slower rate; relaying the data from the payload to earth; receiving the data on earth; and comparing the data with known acceleration time histories to determine hardness and certain other physical properties of the moon surface.

7. A combination for determining certain physical properties of a surface comprising: body means impactable against a surface; means for directing said body means against said surface; means carried by said body for determining the acceleration time thereof; said body means including means for communicating the acceleration time thereof upon impact of said body means against said surface; and means for interpreting the communication from said body means to determine certain physical properties of the test surface.

8. A combination for determining certain physical properties of a surface comprising: penetrometer means impactable against a surface; means for projecting said penetrometer against said surface; accelerometer means carried by said penetrometer; transmitter means carried by said penetrometer and being electrically connected to said accelerometer; means for receiving the acceleration time of said penetrometer as measured by said accelerometer and emitted by said transmitter; means for receiving said acceleration time; and means for comparing said acceleration time with known acceleration time histories to determine certain physical properties of said surface.

9. A combination as in claim 8 wherein said accelerometer is a triaxial accelerometer.

10. A combination for determining certain physical properties of a surface as in claim 9 wherein means is carried by said penetrometer for summing the output of said triaxial accelerometer vectorially to obtain an effective output regardless of the angular acceleration and orientation of the penetrometer during impact.

11. A combination for determining certain physical properties of a planetary surface comprising: means for launching a payload into a trajectory to impact a planetary surface; penetrometer means carried by said payload and being impactable against said planetary surface; means for releasing said penetrometer; means for directing it toward said planetary surface before impact of said payload; means carried by said penetrometer for determining the acceleration time thereof; said body means including communication means for conveying the acceleration time thereof upon impact of said body means against said planetary surface; and means for interpreting the communication from said body means to determine certain physical properties of the planetary surface.

12. A combination for determining certain physical properties of a planetary surface comprising: means for launching a payload into a trajectory to impact a planetary surface; penetrometer means carried by said payload; means for releasing said penetrometer means and directing said penetrometer means toward said planetary surface; accelerometer means carried by said penetrometer means for measuring the acceleration time thereof; transmitting means carried by said penetrometer means and being connected to said accelerometer means; means for receiving the acceleration time information emitted by said transmitting means; and means for comparing the deceleration rate information with known acceleration time histories to determine certain physical properties of the planetary surface.

13. A combination as in claim 12 wherein said accelerometer is a unidirectional accelerometer.

14. A combination as in claim 12 wherein said accelerometer is a triaxial accelerometer.

15. A combination for determining certain physical properties of a planetary surface comprising: means for launching a payload into a trajectory to impact a planetary surface; penetrometer means carried by said payload; means for releasing said penetrometer means and directing said penetrometer means toward said planetary surface; accelerometer means carried by said penetrometer means for measuring the acceleration time thereof; transmitting means carried by said penetrometer means and being connected to said accelerometer means; relay means carried by said payload; said relay means receiving the output from said transmitting means and relaying said output; remotely located receiving mechanism for receiving said relayed information; and means for comparing said relayed information with known acceleration time histories to determine certain physical properties of the planetary surface.

16. A combination for determining certain physical properties of a planetary surface as in claim 15 wherein said relay means includes means for digitizing the output of the transmitting means; means for temporarily storing said output; and means for reading out said output at a slower rate than received.

17. A combination for determining certain physical properties of a planetary surface as in claim 15 wherein said penetrometer includes means for summing the output of said accelerometer means vectorially to obtain an effective output regardless of the angular acceleration and orientation of the penetrometer during impact.

18. A combination for determining certain physical properties of a planetary surface as in claim 15 wherein said penetrometer means includes a series of penetrometers; said penetrometers being released in groups at spaced intervals.

19. A combination for determining certain physical properties of a planetary surface as in claim 15 wherein said penetrometer means includes a series of penetrometers; said payload having a carriage for supporting said penetrometers; said carriage including ramps for directing upon release the penetrometers toward the surface to be tested.

20. A combination for determining certain physical properties of a planetary surface as in claim 15 wherein said penetrometer means includes a series of penetrometers; said payload having carriage means for supporting said penetrometers; and cords embedded within said penetrometers and tied to said carriage means for retaining said penetrometers.

21. A combination for determining certain physical properties of a planetary surface as in claim 20 wherein said release means includes a reefing device for cutting said cords.

22. A combination for determining certain physical properties of a planetary surface as in claim 20 wherein said cords are tied to tensioning means to tightly hold said penetrometers within said carriage.

23. A combination for determining certain physical properties of a planetary surface as in claim 15 wherein said penetrometer means includes a series of penetrometers; and said penetrometers are generally of a spherical configuration.

24. A combination for determining certain physical properties of a planetary surface as in claim 15 wherein said penetrometer means includes a series of penetrometers; and said penetrometers are generally of a cylindrical configuration having a hemispherical nose section and a conical tail section.

25. A combination for determining certain physical properties of a planetary surface as in claim 15 wherein said penetrometer means includes a series of penetrometers; said payload having a retrorocket being fired during release of said penetrometers; said penetrometers being released in groups at spaced intervals during retrorocket firing.

26. A combination for determining certain physical properties of a planetary surface comprising: means for launching a payload into a trajectory to impact a planetary surface; carriage means forming a part of said payload; penetrometers supported by said carriage means and positioned at spaced intervals thereabout; cords embedded in said penetrometers and being fastened to tensioning means; said tensioning means including hollow studs having slidable engagement with said carriage; split nuts threaded on said studs and adapted to engage said carriage means; retaining pins being positioned across said studs and said cords being entrained thereabout; said penetrometers upon rotation of said split nuts being drawn tightly against said carriage; and locking screws threaded through one portion of said split nuts and bearing against another portion to spread said split nuts and wedge them in locking position; means for releasing said penetrometer means and directing said penetrometer means toward said planetary surface; accelerometer means carried by said penetrometer means for measuring the acceleration time thereof; transmitting means carried by said penetrometer means and being connected to said accelerometer means; means for receiving the acceleration time information broadcast by said transmitting means; and means for comparing the acceleration time information with known acceleration time histories to determine certain physical properties of the planetary surface.

27. A combination for determining certain physical properties of a planetary surface as in claim 26 wherein said releasing means is a series of reefing devices; said reefing devices being supported by said carriage and alined so as to cut said cords upon activation; and explosive means to actuate said reefing devices.

28. A penetrometer for utilization in determining certain physical properties of a surface comprising: a generally spherical body made of a material such as epoxy resin with a fiber glass filler; a triaxial accelerometer embedded in said body for measuring the acceleration rate thereof; a transmitter embedded in said body and connected to said accelerometer; a spherical antenna embedded in the surface of said body for transmitting the acceleration rate to a remote point where it can be compared with known acceleration time histories for determining certain physical properties of the surface.

29. A penetrometer for utilization in determining certain physical properties of a surface as in claim 28 wherein said triaxial accelerometer is connected to a squaring and summing circuitry embedded in said body whereby the output of said triaxial accelerometer is summed vectorially to obtain an effective output regardless of the angular acceleration and orientation of the penetrometer during impact.

30. A penetrometer for utilization in determining certain physical properties of a surface comprising: a generally cylindrical body having a hemispherical nose section and a conical tail section made of material such as epoxy resin with a fiber glass filler; a unidirectional accelerometer embedded in said body for measuring the acceleration rate thereof; a transmitter embedded in said body and connected to said accelerometer; a conical antenna embedded in the surface of the conical tail section of said body for transmitting the deceleration rate to a remote point where it can be compared with known acceleration time histories for determining certain surface physical properties.

References Cited

UNITED STATES PATENTS

| | | | |
|---|---|---|---|
| 2,477,094 | 7/1949 | Shropshire | 73—84 |
| 2,639,210 | 5/1953 | Robertson et al. | 73—167 X |
| 2,796,760 | 6/1957 | Warlam | 73—82 |
| 3,110,178 | 11/1963 | Marks et al. | 73—170 |
| 3,190,110 | 6/1965 | Craycraft | 73—12 |

DAVID SCHONBERG, *Primary Examiner.*